United States Patent [19]

Leluan et al.

[11] Patent Number: 5,281,439
[45] Date of Patent: Jan. 25, 1994

[54] PROCESS FOR UNIFORMLY INTEGRATING A SOLID CHARGE WITHIN A POROUS SUBSTRATE

[75] Inventors: Jean-Luc Leluan, Bordeaux; Jacques Rey, Merignac; Christian Bertone, Castelnau de Medoc; Bruno Bernard, Eysines, all of France

[73] Assignee: Societe Europeenne de Propulsion, Suresnes, France

[21] Appl. No.: 899,255

[22] Filed: Jun. 16, 1992

[30] Foreign Application Priority Data

Jun. 17, 1991 [FR] France ................... 91 07393

[51] Int. Cl.⁵ .................... B05D 1/36; B05D 1/42; B05D 7/22
[52] U.S. Cl. .................... 427/294; 427/295; 427/296; 427/297; 427/298; 427/369; 427/370; 427/439; 427/440
[58] Field of Search ............. 427/294, 295, 296, 297, 427/298, 369, 370, 439, 440

[56] References Cited

U.S. PATENT DOCUMENTS

| | | | |
|---|---|---|---|
| 2,005,637 | 6/1935 | Schidrowitz | 427/296 |
| 3,513,020 | 5/1970 | West | 427/296 X |
| 4,311,735 | 1/1982 | Young | 427/295 |
| 4,568,594 | 2/1986 | Hordonneau et al. | 427/376.1 X |
| 4,609,563 | 9/1986 | Shimrock et al. | 502/439 X |
| 4,814,127 | 3/1989 | Toyoda | 264/56 |
| 4,983,422 | 1/1991 | Davis et al. | 427/228 |

FOREIGN PATENT DOCUMENTS

| | | |
|---|---|---|
| 0130105 | 1/1985 | European Pat. Off. . |
| 0307968 | 3/1989 | European Pat. Off. . |
| 0434501 | 6/1991 | European Pat. Off. . |
| 2365539 | 4/1978 | France . |
| 2526785 | 5/1982 | France . |
| 2508999 | 1/1983 | France . |
| 2589855 | 5/1987 | France . |
| 2626570 | 8/1989 | France . |
| 2655977 | 6/1991 | France . |
| 8605774 | 10/1986 | World Int. Prop. O. . |

*Primary Examiner*—W. J. Shine
*Assistant Examiner*—Douglas J. McGinty
*Attorney, Agent, or Firm*—Weingarten, Schurgin, Gagnebin & Hayes

[57] ABSTRACT

The process is particularly well suited to the manufacture of composite materials, where a fibrous reinforcement texture is to be impregnated by a densifying matrix, and comprises the steps of:

preparing a slurry containing a solid charge in the form of finely divided particles dispersed in a carrier liquid, which preferably contains an organic compound, placing a substrate inside an enclosure, creating a vacuum inside the enclosure, and causing the slurry to pass through the substrate by means of a pressure difference.

Uniformity of charge integration is ensured by forcing the slurry to pass through the substrate several times, in successively opposite directions. The concentration of solid charge in the slurry can be determined as a function of an intended charge percentage by volume in said substrate.

4 Claims, 2 Drawing Sheets

PROCESS FOR UNIFORMLY INTEGRATING A SOLID CHARGE WITHIN A POROUS SUBSTRATE

BACKGROUND OF THE INVENTION

1. Field of the Invention

The present invention relates to a process for uniformly integrating a solid charge, composed of finely divided particles, within a porous substrate.

A particular field of the present invention includes the manufacture of composite materials comprised of a fibrous reinforcement texture densified by a matrix filling at least a part of the texture's pores.

2. Prior Art

One known process for introducing a solid charge within a fibrous texture consists in impregnating the latter using a composition containing a solid charge in the form of finely divided particles in suspension within a liquid carrier.

For instance, document EP-A-0 130 105 discloses a process for manufacturing a ceramic matrix composite material by impregnating the fibrous reinforcement material first with a slurry containing a ceramic powder, and then with a fluid composition based on a precursor which, upon thermal treatment, yields a compound that is identical to the ceramic powder in suspension. The ceramic matrix is consequently formed by both the ceramic powder and the compound derived from the precursor. The use of a ceramic powder suspension in a slurry makes it possible to fill in a large part of the pores in the fibrous reinforcement texture, and thus accelerates its densification compared with the classical process involving successive impregnations with a matrix precursor.

Document FR-A-2 655 977 discloses a similar type of process in which impregnation by a slurry containing a suspension of ceramic powder is achieved by setting up a pressure difference.

There is also known from document FR-A-626 570 a process for the manufacture of a carbon-carbon composite material in which a metallic carbide charge is introduced into the carbon matrix. To this end, the carbon matrix is obtained by impregnating a carbon reinforcement texture with a pitch which is doped with metallic carbide in powder form, and which constitutes a precursor for the carbon matrix.

Among the aforementioned prior art processes, those that employ a slurry containing a powder in suspension for the purpose of densifying the fibrous reinforcement matrix do not allow control of quantity of powder to be integrated into the fibrous texture. Indeed, the latter is generally placed above a filter, while the slurry is admitted from above the fibrous texture, possibly by setting up a pressure difference. The powder contained in the slurry, and retained by the filter, gradually fills in the pores of the fibrous texture. Impregantion is stopped when the powder covers the upper surface of the texture. In this way, the pores are filled in as much as possible by the powder. However, it is not possible to achieve a partial densification by the powder with any degree of uniformity, since the powder accumulates in the parts of the texture lined by the filter.

Similarly, the process in which a carbide charge is incorporated in a pitch that constitutes the carbon matrix precursor does not ensure a uniform distribution of the charge within the resulting matrix.

SUMMARY OF THE INVENTION WITH OBJECTS

It is thus an object of the present invention to provide a process for integrating a solid charge within a porous substrate, in a controlled and uniform manner, whether it be for the densification of a porous substrate by a matrix, or for doping a solid charge within a matrix intended to densify a porous substrate.

The above object is achieved by a process comprising the steps of:

preparing a slurry containing a solid charge in the form of finely divided particles dispersed in a carrier liquid, placing a substrate inside an enclosure, creating a vacuum inside the enclosure, and causing the slurry to pass through the substrate by means of a pressure difference, wherein, according to the present invention, the slurry is forced to pass through the substrate a plurality of times, in successively opposite directions.

The forced passage of the slurry through the substrate in successively opposite directions allows the charge to be uniformly distributed within the substrate.

The charge density within the substrate is directly related to concentration of solid charge particles in the slurry, so that it is possible to control the volume percentage of charge within the substrate by setting the corresponding concentration of solid charge in the slurry. The liquid preferably contains an organic compound.

Advantageously, the forced passage of the slurry through the substrate is achieved simply by displacing, in synchronism, two pistons forming opposite walls of the enclosure.

BRIEF DESCRIPTION OF THE DRAWINGS

Particular implementations of the invention are described below by way of non-limiting examples, with reference to the accompanying drawings in which.

DETAILED DESCRIPTION OF THE PREFERRED EMBODIMENTS

Figure 1:
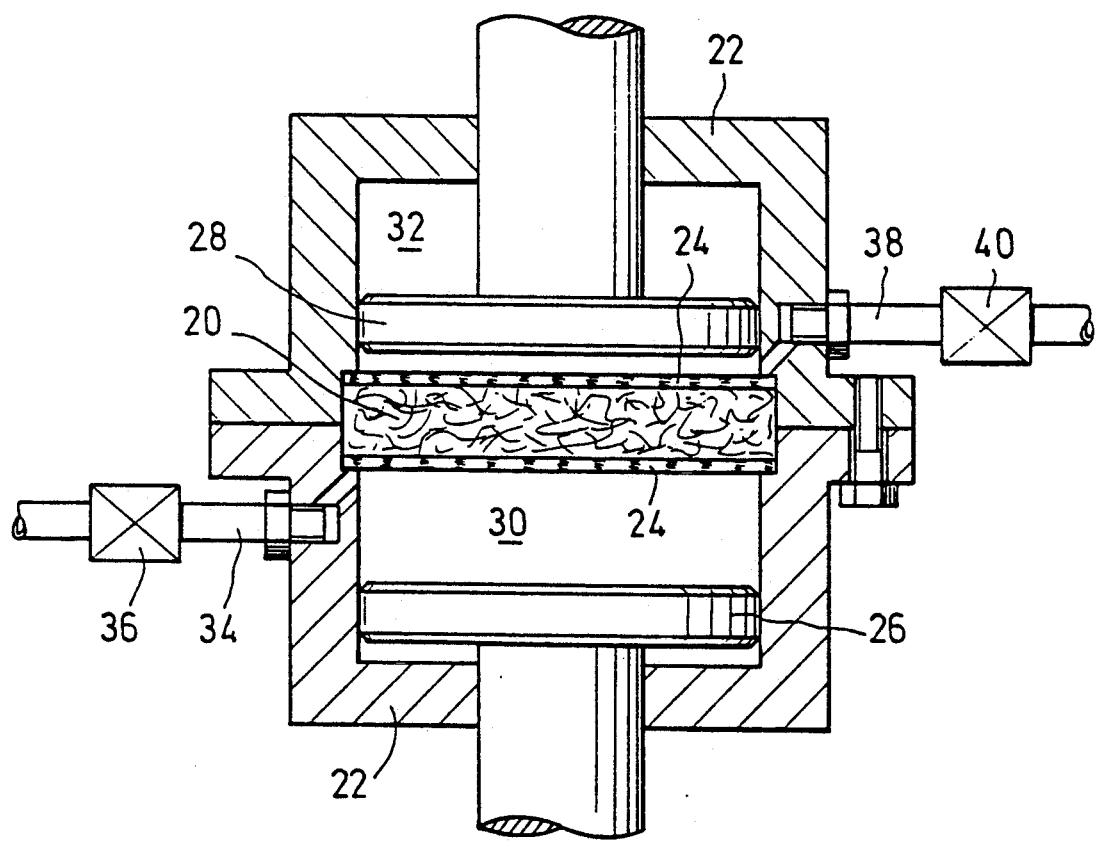
FIG. 1 is a schematic cross-sectional view of an apparatus for carrying out the process according to the present invention.

FIG. 1 shows an apparatus for integrating a solid charge within a porous substrate in a uniform and controlled manner, the substrate being in this case a fibrous texture 20 intended to form the reinforcement texture of a composite material component.

The fibrous texture 20, which is in the form of a disk, is placed inside an enclosure 22 between two coarse screens 24 consisting of perforated sheet metal plates. Pistons 26, 28 slide inside respective chambers 30, 32 on either side of the texture 20, the chambers being delimited by the enclosure 22 and the texture 20 itself. The impregnating composition is fed into one of the chambers (in this case 30) by an inlet pipe 34 fitted with a stop valve 36 and terminating inside the chamber through one of the enclosure walls in the immediate proximity of the texture 20. A suction pipe 38 fitted with a stop valve 40 connects a vacuum source (not shown) to the other chamber 32, in the immediate proximity of the texture 20 through a region of the enclosure wall directly opposite the region where inlet pipe 34 terminates.

EXAMPLE 1

In this example, the apparatus of FIG. 1 is used to produce a radome made of alumina/alumina composite material.

The fibrous texture 20 consists of a mat made from alumina fibers, available from ICI of Great Britain under the reference "Saffil".

The texture 20 is densified by means of an impregnating composition or slurry prepared from the following constituents:
100 parts by weight of a liquid alumina precursor consisting of aluminum oxichloride,
70 parts by weight of sub-micron alumina powder, and
15 parts by weight of thermoplastic resin consisting of polymethyl methacrylate.

The reinforcement texture 20 is placed between the two coarse screens 24 and a vacuum is formed in the enclosure by closing valve 36 and opening valve 40. Then, valve 36 is opened to admit a predetermined quantity of impregnating composition into chamber 30. The composition is forced to pass through the reinforcement texture 20 by the depression that continues to exist in the chamber 32.

After there elapses a predetermined amount of time sufficient for the texture 20 to be completely passed through by the impregnating composition, valve 40 is closed.

The pistons 26, 28 are then set in synchronism to force the impregnating composition to pass through the reinforcement texture 20 twice successively in opposite directions. As a result, a uniform impregnation of the texture is achieved.

It can be noted that the coarse screens 24 have openings that are much larger than the dimensions of the alumina particles. None of the screens 24 provides a filtering function in view of retaining the alumina particles in the reinforcement texture; the purpose of these screens 24 is simply to hold the reinforcement texture in position.

The impregnated reinforcement texture kept between coarse screens 24 is withdrawn from the enclosure to undergo a baking cycle. This is carried out by placing the reinforcement texture under a press or inside an autoclave and progressively raising the temperature to around 250° to 300° C. with intermediate plateaus.

A ceramic formation cycle is then carried out in a furnace whose temperature is gradually raised to 950° C., yielding the desired alumina/alumina composite randome, after stabilisation at 1400° C.

Measurements conducted on a number of randomes obtained by the above process have shown that they all display the same electromagnetic characteristics (effective permittivity, dielectric loss factor, etc.), which would indicate that the densification within the reinforcement texture is obtained in a reproducible and uniform manner.

EXAMPLE 2

In this example, a composite material is produced for a carbon/carbon brake disk with a solid charge integrated within the matrix.

The apparatus illustrated in FIG. 1 is used to integrate a predetermined quantity of solid charge, such as a silicon carbide powder, within the carbon fiber reinforcement before the latter is densified by a carbon matrix.

The fibrous texture 20 or preform comprises two-dimensional carbon fiber plies that are joined together by needling. The plies are formed of layers of carbon fiber cloth. Layers of carbon fiber web can be placed between the cloth layers so as to provide fibers that can easily be picked up by the needles during the needling process, where they can then be implanted through the plies.

The silicon carbide particles are integrated through an impregnation process using a slurry prepared from the following constituents:
21.8% by weight of silicon carbide powder,
0.4% of deflocculant (ester phosphate),
51.4% of methyl ethyl acetone, and
26.4% pure ethanol.

The preform 20 is placed inside the enclosure 22 and, after the latter has been evacuated, the above-defined slurry is introduced. As in example 1, the slurry is passed through the preform in successively opposite direction twice by means of the pistons 26, 28. The residual slurry is recovered and the impregnated texture is dried in an oven.

The volume percentage, $V_{cb}$, of the solid charge material in the slurry is determined as a function of the desired volume percentage, $V_{cp}$, of the solid charge in the preform by the formula:

$$V_{cb} = 100 V_{cp}/(100 - V_f),$$

where $V_f$ is the volume percentage of fibers in the preform, that is to say the percentage of the preform's apparent volume effectively occupied by the fibers.

The theoretical mass of charge material ingested by the impregnated preform after drying is given by the formula:

$$M_{cp} = 100(d_c V_{cp})/(d_f V_f),$$

where $d_c$ and $d_f$ are respectively the density of charge material and the density of the fiber.

A test was conducted on a disk-shaped preform of 80 mm diameter and 30 mm thickness, with a fiber volume ratio equal to 25%. After drying, the measured mass absorption was 33% for a theoretical value of 36.6%.

Also, observation through a cross-section of the impregnated and dried preform (FIG. 2) reveals a uniform distribution of the silicon carbide charge in the preform.

The process according to the present invention thus allows a dosed and homogenous integration of a solid charge within a porous substrate.

EXAMPLE 3

For comparison, this example proceeds as in example 2, except for impregnation process, which is instead carried out under atmospheric pressure by passing the slurry by gravity feed once only, and along one direction through the preform. The preform is a rectangular block measuring 55×55×36 mm.

Figure 2:
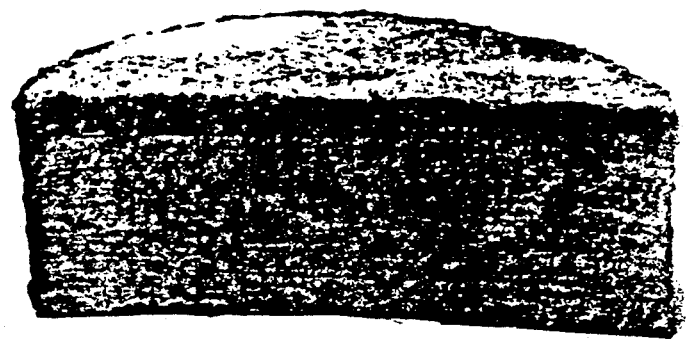
FIGS. 2 and 3 are cross-sectional views through fibrous substrates in which a solid charge is integrated by impregnation according to a prior process and the process according to the invention, respectively.
Figure 3:
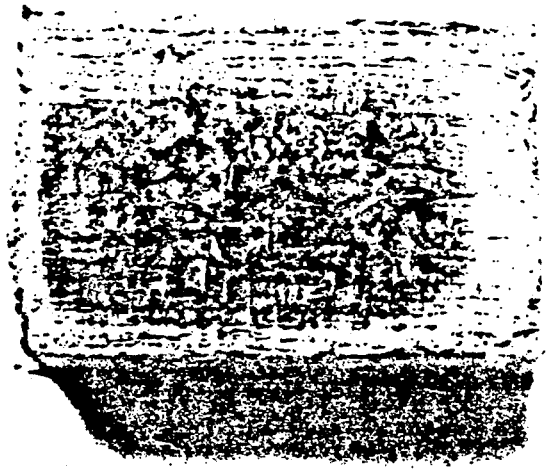

After the impregnated preform is dried, observation through a cross-section thereof (FIG. 3) reveals an inhomogeneous integration of the solid charge, in contrast with FIG. 2.

Naturally, variations can be brought to the above-described implementations of the process according to the invention without departing from the scope of protection defined by the claims.

For instance, it can be envisaged to admit the slurry on either side of the substrate once the porous substrate is placed in the enclosure and a depression is formed therein, before conducting carrying out the forced impregnation in successively opposite directions by means of the synchronously displaced pistons.

The present invention can also be implemented for the integration of solid charges other than the ceramic powders considered in the above examples, into porous substrates other than fibrous textures.

We claim:

1. A process for uniformly integrating a solid charge within a porous substrate, comprising the steps of:
   preparing a slurry containing a solid charge in the form of finely divided particles dispersed in a carrier liquid,
   placing said substrate within an enclosure with said substrate having two opposite accessible first and second sides delimiting a first and a second chamber, respectively, inside said enclosure,
   introducing said slurry into one of said first and second chambers and creating a vacuum in the other of said first and second chambers to cause said slurry to pass through said substrate into the other of said first and second chambers, and
   causing said slurry to pass through said substrate a plurality of times by establishing a pressure difference in successively opposite directions to force said slurry to pass through said substrate alternately from the one of said first and second chambers into the other of said first and second chambers and from the other of said first and second chambers into the one of said first and second chambers, whereby a uniform distribution of the solid charge within the substrate is achieved.

2. The process according to claim 1, wherein the concentration of said solid charge in said slurry is determined as a function of an intended charge percentage by volume in said substrate.

3. The process according to claim 1, wherein said liquid contains an organic compound.

4. The process according to claim 1, wherein said first chamber comprises a first piston forming a wall opposite to said first side and said second chamber comprises a second piston forming a wall opposite to said second side, wherein said slurry is forced through said substrate in successively opposite directions by displacing, in synchronism, said first and second pistons.

* * * * *